United States Patent [19]
Yokochi

[11] Patent Number: 5,214,273
[45] Date of Patent: May 25, 1993

[54] CONTACT IMAGE SENSOR

[75] Inventor: Toshiyuki Yokochi, Hachioji, Japan

[73] Assignee: Kabushiki Kaisha Toshiba, Kawasaki, Japan

[21] Appl. No.: 671,946

[22] Filed: Mar. 19, 1991

[30] Foreign Application Priority Data

Mar. 20, 1990 [JP] Japan .................. 2-28497[U]

[51] Int. Cl.$^5$ .............. H04N 1/028; G01J 1/02; G06K 9/20; H01L 27/146
[52] U.S. Cl. ................... 250/208.1; 358/484
[58] Field of Search ............. 250/208.1; 358/471, 358/484

[56] References Cited

U.S. PATENT DOCUMENTS 4,675,534 6/1987 Sekimura et al. ............. 250/208.1

FOREIGN PATENT DOCUMENTS 60-218967 11/1985 Japan ................... 358/484

OTHER PUBLICATIONS

McGraw-Hill Dictionary of Scientific and Technical Terms, Second Edition, Daniel N. Lapedes, Editor in Chief, McGraw-Hill Book Company, New York, Copyright © 1974, 1976, 1978, pp. 1227, 1562 and 1585.

Primary Examiner—Constantine Hannaher
Attorney, Agent, or Firm—Finnegan, Henderson, Farabow, Garrett & Dunner

[57] ABSTRACT

A contact image sensor for use as an image readout unit in a facsimile machine or the like equipment, wherein, for the purpose of realizing reduction of its cost and improvement of its assembling performance, a rod lens array and a photoelectric converter element array are supported by a first supporting member while a light source is supported by a second supporting member separate from the first supporting member.

5 Claims, 2 Drawing Sheets

CONTACT IMAGE SENSOR

BACKGROUND OF THE INVENTION

1. Field of the Invention

The present invention relates to a contact image sensor which is used as a picture image reading means in a facsimile machine or the like.

2. Description of the Related Art

FIG. 5 shows an example of an arrangement of a prior art contact image sensor.

The contact image sensor of FIG. 5 comprises a light source 11, a glass cover 12, a rod lens array 13, a photoelectric converter element array 14, a main frame 15 carrying thereon the above elements, and a substrate 16. The photoelectric converter element array 14 is supported to the main frame 15 via the substrate 16.

More in detail, the main frame 15 is made of metal allowing quick heat radiation therefrom such as aluminum, taking the heat radiation of the light source 11 into consideration. That is, in the prior art, the main frame 15 is formed by drawing metal, such as aluminum, and then applying a fabricating operation, such as cutting, to it.

However, the main frame 15 formed through the above drawing and fabricating operations is high in material cost and processing cost, which forms one of the major factors causing increases in the costs of the contact image sensor.

In addition, such a main frame 15 as formed in the aforementioned manner is low in dimensional accuracy. For this reason, mounting such a rod lens array 13 and a photoelectric converter element array 14 requires high mounting accuracy, and therefore, requires adjusting the mounting attitude of these members, which results in reduction of its assembling efficiency.

SUMMARY OF THE INVENTION

In view of the above problems in the prior art, it is therefore an object of the present invention to provide a contact image sensor which can realize the reduction of its cost and the improvement of its assembling performance.

In accordance with an aspect of the present invention, the above object is attained by a contact image sensor which comprises a light source, a rod lens array, and a photoelectric converter element array, and wherein the rod lens array and the photoelectric converter element array are supported in a first supporting member while the light source is supported in a second supporting member provided separately from the first supporting member.

In the present invention, since the material of the first supporting member for supporting the rod lens array and the photoelectric converter element array can be made different from that of the second supporting member for supporting the light source, when these materials are suitably selected, the cost of the contact image sensor can be lowered and its assembling performance can be improved.

That is, when the first supporting member is made of, for example, such inexpensive synthetic resin material as to allow its easy molding and to have a high molding accuracy, a material cost and a processing cost can be reduced. In addition, since the need for adjusting the mounting attitude of the rod lens array and the photoelectric converter element array can be removed, its assembling performance can be improved.

Further, since the second supporting member does not require its very high processing accuracy, the second member can be made by processing such a metal plate having a good heat radiating property as an aluminum plate by common molding means including press operation, which results in that a processing cost can be reduced.

In accordance with another aspect of the present invention, since the color and surface quality of the first supporting member can be freely selected, when the above color and surface quality are selected so as to cause lowering of the light reflection factor of the supporting member, the unnecessary reflection of light from the light source on the surface of the first supporting member can be suppressed and therefore a readout accuracy can be increased.

DESCRIPTION OF THE PREFERRED EMBODIMENTS

Figure 1:
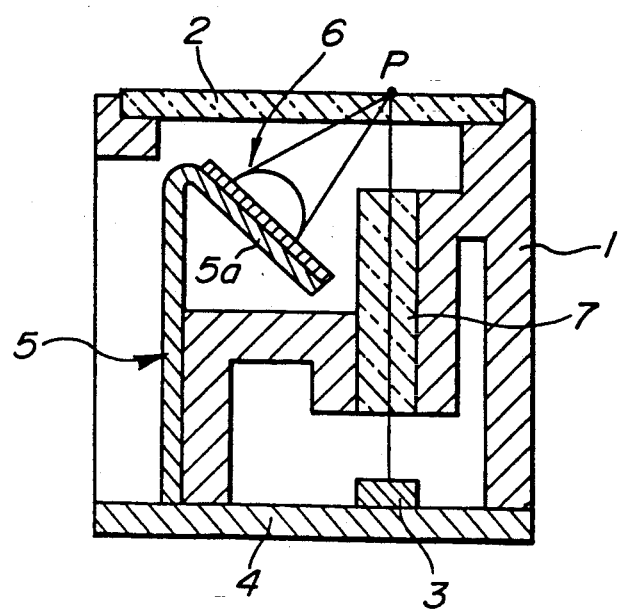
FIG. 1 is a vertical cross-sectional view for explaining the concept of a contact image sensor in accordance with an embodiment of the present invention.

In FIG. 1, which shows an embodiment of the present invention, a main frame 1 as a first supporting member supports on its upper ends a horizontally-extended glass cover 2, and also is fixed on its lower ends with a substrate 4 on which a photoelectric converter element array 3 is mounted.

The main frame 1, which is made of a synthetic resin material, is formed by means of, for example, injection molding.

Fixed to a side of the main frame 1 and contacted therewith is a base of a light source holder 5 as a second supporting member by screwing or bonding means or other suitable connecting means. The light source holder 5, which is made of metal having good heat radiation, such as aluminum, has a bent part 5a formed in its upper part, on an upper side of which bent part 5a a light source 6 is mounted.

The bent part 5a is located in a space defined by the glass cover 2 and the main frame 1. The mounting position of the light source 6 is set so that light emitted from the light source 6 focuses on a readout position P set on the glass cover 2.

At a position directly below the readout position P, a rod lens array 7 is positioned so as to pass through the main frame 1. More specifically, the rod lens array 7 is supported in the main frame 1 so that the optical axis of the rod lens array 7 is in alignment with a line connected between the readout position P and the photoelectric converter element array 3.

The photoelectric converter element array 3, light source 6 and rod lens array 7 are disposed along a width direction of an original document sheet (not shown) to be placed on the glass cover 2, that is, along a direction perpendicular to the paper sheet of FIG. 1, and have an arrangement and operation that are discussed below.

That is, the photoelectric converter element array 3 is made up of many photoelectric converter elements, such as CCDs, arranged in a row along a length of the original sheet corresponding to its readout width or in zigzags, and functions to convert the density (indicative of the degree of black and white) of a picture on the original sheet into an electric signal.

The light source 6, which is made up of an LED array or the like, irradiates the original sheet at the readout position P.

Further, the rod lens array 7 is provided to focus by one to one (1:1) magnification an image of a picture of the original sheet located at the readout position P on the photoelectric converter element array 3. To this end, the rod lens array 7 is made up of many rod lenses arranged parallel to each other with their optical axes.

In the contact image sensor of the foregoing embodiment, the light source 6 causing heat generation is supported by the light source holder 5 provided separately from the main frame 1, whereas the other elements 2, 3 and 7 causing no heat generation are supported by the main frame 1. However, the photoelectric converter element array 3 is supported by the main frame 1 via the substrate 4. Accordingly, it is not required for the main frame 1 to have a good heat radiating property, which means that it is unnecessary to make the main frame 1 of such expensive metallic material as aluminum.

Thus, when the main frame 1 is made of, for example, the aforementioned synthetic resin material and then molded by injection molding, the main frame 1 can be inexpensively obtained.

Further, since the above injection molding using molds as molding means is high in molding accuracy, in the case where the main frame 1 is molded by such injection molding, the photoelectric converter element array 3 and the rod lens array 7 can be accurately mounted at their predetermined positions. As a result, the need for adjusting the mounting positions of these elements can be eliminated and its assembling performance can be improved.

Furthermore, since the color of the main frame 1 can be freely selected, when such color having a low light reflection factor as black is employed as the color of the frame 1, the unnecessary reflection of light from the light source 6 on surfaces of the frame 1 is suppressed to increase a readout accuracy.

In addition, since the surface quality of the main frame 1 can also be freely selected, when such processing for lowering the light reflection factor as matte finish is applied to the surfaces of the frame 1, this can suppress the unnecessary light reflection on the frame surfaces.

Meanwhile, when the light source holder 5 is made of such metallic material having a good heat radiating property (thermal conductivity) as aluminum, increase in the temperature of the light source 6 can be suppressed to as minimal a level as possible. Since the light source holder 5 does not require very high processing accuracy, the light source holder 5 can be easily and inexpensively made by such common processing means as a press operation.

In the foregoing embodiment, further, since the main frame 1 and the light source holder 5 are separate, the shapes of these members can be made highly flexible. Thus, when such member shapes as to allow effective use of an occupation space of a facsimile machine or the like application equipment is employed for the image sensor, such application equipment can be minimized in size. When the main frame 1 and the light source holder 5 are shaped so as to allow integral formation thereof with a paper guide, a frame and so on in the above application equipment, the application equipment can be further reduced in size and lowered in cost.

Figure 2:
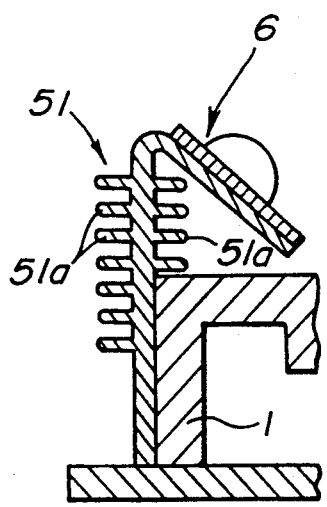
FIGS. 2 and 3 are each vertical cross-sectional views of other examples of the light source holder shown in FIG. 1.
Figure 3:
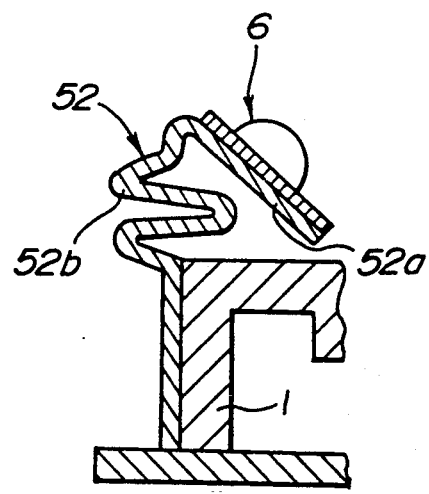

In place of the light source holder 5 in FIG. 1, such light source holders 51 and 52 as shown in FIGS. 2 and 3 may be used.

The light source holder 51 of FIG. 2 is provided at its both sides with heat radiation fins 51a projected therefrom. The light source holder 52 of FIG. 3 is formed with a bent part 52a and another bent part 52b extended in zigzag in the vicinity of the bent part 52.

Since the light source holders 51 and 52 having the radiation fins 51a and the bent part 52b are larger in heat radiation area than the light source 5 of FIG. 1, the light source holders 51 and 52 can have a higher heat radiation effect.

Although the light source holders 5, 51 and 52 are formed to be extended continuously in a direction perpendicular to the plane of the paper sheets of FIGS. 1, 2 and 3 respectively, such holders having the same sectional shapes of these holders 5, 51 and 52 and having smaller widths in the above direction may be employed. In the latter case, a plurality of such holders are disposed at spaced suitable intervals in the above direction so as to support the light source 6 at multiple points.

Figure 4:
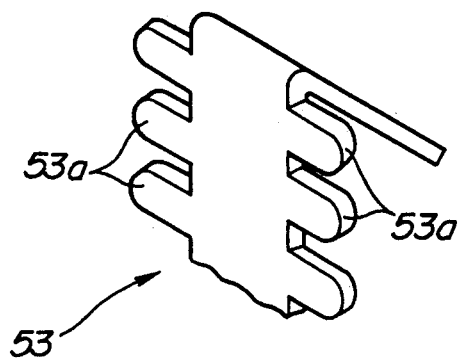
FIG. 4 is a perspective view of yet a further example of the light source holder.
Figure 5:
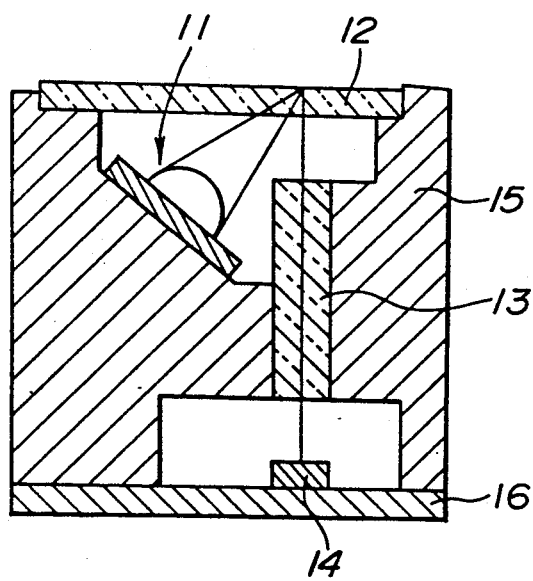
FIG. 5 is a vertical cross-sectional view of an exemplary arrangement of a prior art contact image sensor.

In addition, as the light source holder of the above multi-point supporter, a holder 53 may be used which is provided at its both sides with radiation fins 53a projected therefrom as shown in FIG. 4. Of course, the projection direction of the radiation fins 53a of the holder 53 is perpendicular to the plane of the paper sheet of FIG. 1.

What is claimed is:

1. A contact image sensor comprising:
   a light source;
   a rod lens array;
   a photoelectric converter element array;
   a first supporting member for supporting said rod lens array and said photoelectric converter element array, the first supporting member being formed from a synthetic resin and having a surface that has been treated to lower the light reflection factor of the surface; and
   a second supporting member for supporting said light source, said second supporting member being separate from said first supporting member and being made of a material having a good heat radiating property.

2. A contact image sensor as set forth in claim 1, wherein said first supporting member has a color having a low light reflection factor.

3. A contact image sensor as set forth in claim 1, wherein said material is aluminum.

4. A contact image sensor as set forth in claim 1, wherein said second supporting member has a bent part in its upper part and said light source is positioned on an upper surface of said bent part.

5. A contact image sensor as set forth in claim 1, wherein said second supporting member includes radiation fins.

* * * * *